United States Patent
Sahai

(10) Patent No.: US 9,299,067 B2
(45) Date of Patent: Mar. 29, 2016

(54) METHOD OF OBTAINING PAYMENT INFORMATION USING AN IMAGING BARCODE SCANNER

(71) Applicant: NCR Corporation, Duluth, DE (US)

(72) Inventor: Ritesh Kumar Sahai, Bangalore (IN)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 14/340,702

(22) Filed: Jul. 25, 2014

(65) Prior Publication Data

US 2016/0026980 A1    Jan. 28, 2016

(51) Int. Cl.
*G06Q 20/10* (2012.01)
*G06Q 20/04* (2012.01)

(52) U.S. Cl.
CPC ............. *G06Q 20/10* (2013.01); *G06Q 20/042* (2013.01)

(58) Field of Classification Search
CPC ..... G06Q 20/10; G06Q 20/042; G06Q 20/20; G06K 7/1096; G06K 7/1447; G06K 7/10; G06K 7/1095; G06K 7/10722
See application file for complete search history.

(56) References Cited

U.S. PATENT DOCUMENTS 6,974,083 B1 * 12/2005 Kahn et al. ............... 235/462.14
8,390,831 B2 * 3/2013 Nozaki ........................ 358/1.13

* cited by examiner

*Primary Examiner* — Kristy A Haupt
(74) *Attorney, Agent, or Firm* — Paul W. Martin; Schwegman, Lundberg & Woessner

(57) ABSTRACT

A method of obtaining payment information using an imaging barcode scanner. An example method includes activating, by a processor, an imaging barcode scanner to scan a payment medium, such as a payment card, to obtain payment information from the payment medium. The processor may activate the imaging barcode scanner after failing to receive the payment information from a default payment peripheral, such as a card reader.

18 Claims, 3 Drawing Sheets

METHOD OF OBTAINING PAYMENT INFORMATION USING AN IMAGING BARCODE SCANNER

BACKGROUND

This present invention relates to methods of processing payment and more specifically to a method of obtaining payment information using an imaging barcode scanner.

A typical method of processing payment is by reading a magnetic stripe on card, such as a credit, debit, gift, or electronic benefit transfer (food stamp) card by a card reader. A card reader may also read a loyalty card during a payment process to ensure rewards, discounts, and other incentives are credited to a customer.

However, some cards may not be readable after their magnetic stripes are damaged. In this situation, card data must be entered using a keyboard. Key-entering card data is a time consuming process. When the customer is performing a purchase transaction at a self-checkout station, the checkout software running on the self-checkout station may require an attendant to come over and manually enter the card data, which both lengthens the purchase transaction and ties up the attendant.

Therefore, it would be desirable to provide a method of obtaining payment information using an imaging barcode reader.

SUMMARY

In accordance with the teachings of the present invention, a method of obtaining payment information using an imaging barcode scanner is provided.

An example method includes activating, by a processor, an imaging barcode scanner to scan a payment medium to obtain payment information from the payment medium.

Another example method includes receiving, by a processor, product identification information associated with a product from the imaging barcode scanner, activating, by the processor, the imaging barcode scanner to scan a payment medium to obtain payment information from the payment medium, and applying, by the processor, the payment information to complete payment from the product.

Another example method includes receiving, by a processor, product identification information associated with a product, displaying, by the processor, a first prompt to use a payment peripheral to enter payment information, failing, by the processor, to receive the payment information from the payment peripheral, and displaying, by the processor, a second prompt to use an imaging barcode scanner to enter the payment information, and activating, by the processor, the imaging barcode scanner to scan a payment medium to obtain the payment information.

BRIEF DESCRIPTION OF THE DRAWINGS

The present invention may take form in various components and arrangement of components and in various methods. The drawings are only for purposes of illustrating example embodiments and alternatives and are not to be construed as limiting the invention.

DETAILED DESCRIPTION

Figure 1:
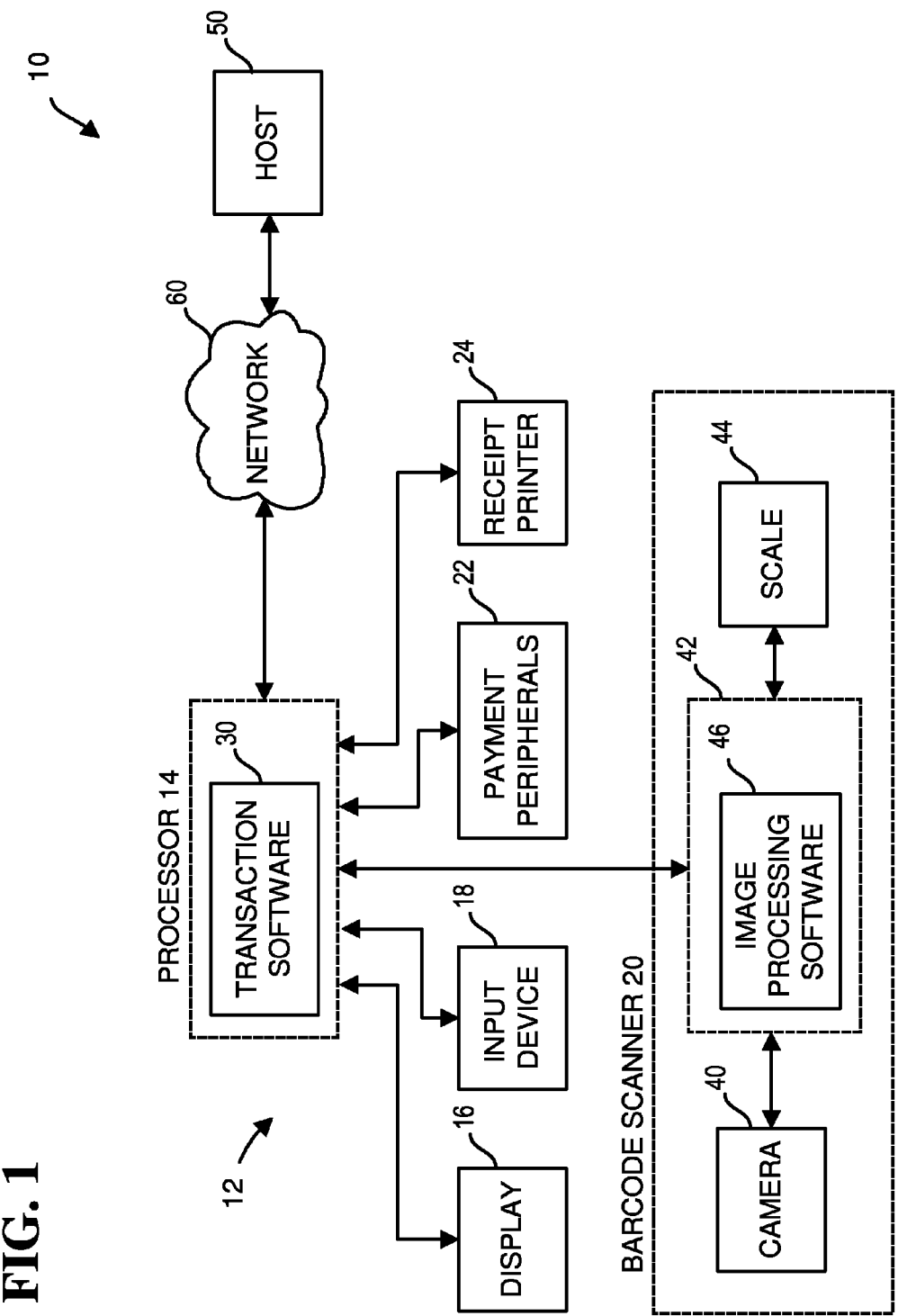
FIG. 1 is a block diagram of an example transaction system.

With reference to FIG. 1, an example transaction system 10 includes computer system 12. Computer system 12 includes one or more processors 14, memory, and program and data storage, which may be housed together as a terminal. Processor 14 executes an operating system such as a Microsoft, Linux, Apple, or other operating system. Processor 14 may execute other computer software which stored in a computer readable medium, such as a memory. For example, processor 14 may execute transaction software 30 which displays transaction screens on display 16 for guiding an operator through a transaction and receives operator inputs and selections during the transaction from input device 18.

Display 16 and input device 18 may be combined as a touch screen.

Computer system 12 further includes barcode reader 20, which obtains information from barcodes on products. For this purpose, barcode reader 20 includes one or more cameras 40 for capturing images of products and control circuitry 42 for processing captured images to locate and decode barcodes in the images. Barcode reader 20 may include an integrated scale 44 for weighing produce items.

In an example embodiment, camera 40 also captures images of different media for completing payment, including but not limited to credit cards, debit cards, smart cards, gift cards, electronic benefit cards, loyalty cards, checks, stamps and vouchers.

Control circuitry 42 processes the images using image processing software 46, some of which may also be used to process barcodes. Example image processing software 46 may include optical character recognition software to obtain alphanumeric information from payment media, such as card numbers, cardholder names, and expiration dates. Other example image processing software 46 may include feature locating software for locating features in images of payment media to assist with their recognition and processing. Control circuitry 42 then provides the payment information to transaction software 30.

Alternatively, control circuitry 42 may send the images to processor 14 or host 50 for processing to obtain the payment information. Processor 14 or host 50 execute the image processing software and pass the payment information to transaction software 30.

Computer system 12 may further include other peripherals, including payment peripherals 22 and receipt printer 24.

Payment peripherals 22 may include any of a personal identification number (PIN) keypad (or "PIN pad"), a card reader, a signature capture device, a coin and/or bank note acceptor, a coin and/or bank note dispenser, and a cash drawer, depending upon the purpose and configuration of computer system 12.

For example, computer system 12 may be configured as an assisted-service transaction system to be operated by a store employee. In this example configuration, payment peripherals 22 may include a PIN pad, a card reader, a signature capture device, and a cash drawer.

As another example, computer system 12 may be configured as a self-service transaction system to be operated by a customer. In this example configuration, payment peripherals 22 may include a PIN pad, a card reader, a signature capture device, a coin and/or bank note acceptor, and a coin and/or bank note dispenser. Acceptors and dispensers may instead be recyclers.

Receipt printer 24 prints transaction documents, including receipts.

Computer system 12 further includes graphics circuitry for providing transaction screens to display 16, network circuitry for connecting to network 60, and peripheral connection circuitry such as Universal Serial Bus (USB), serial RS-232, serial RS-485, Firewire, or other circuitry for connecting peripherals.

Computer system 12 may be coupled to other computers, including an in-store or remote (e.g., cloud) host computer 50 via network 60. Host computer 50 may store information about products including their prices in a table, such as a price look-up file. Computer system 12 obtains prices and possibly other information from host computer 50 during transactions.

Network 60 may include one which uses the transmission control protocol/internet protocol (TCP/IP). Network 60 may include a combination of local area and wide area networks. Network 60 may include any combination of wireless or wired networks. Network 60 may include a combination of private and public networks, including a global communication network, also known as the Internet.

Figure 2:
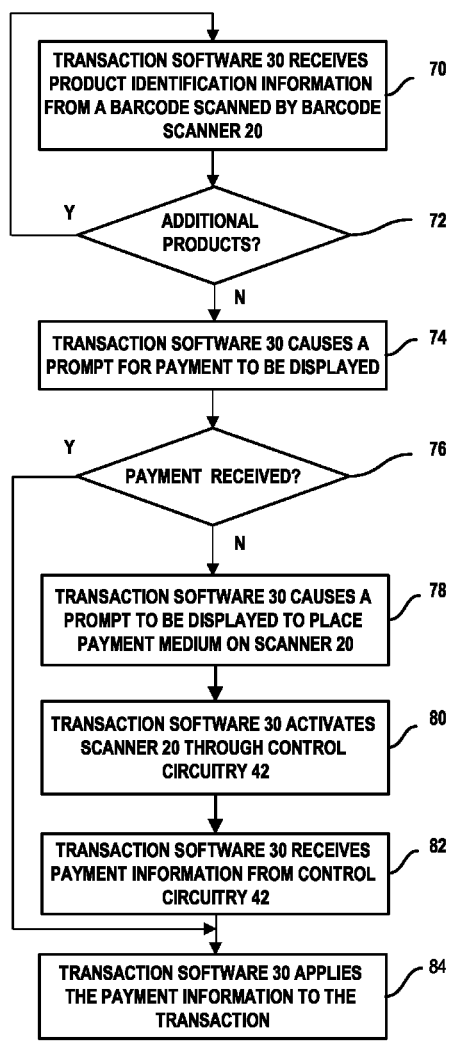
FIG. 2 illustrates an example transaction method.
Figure 3:
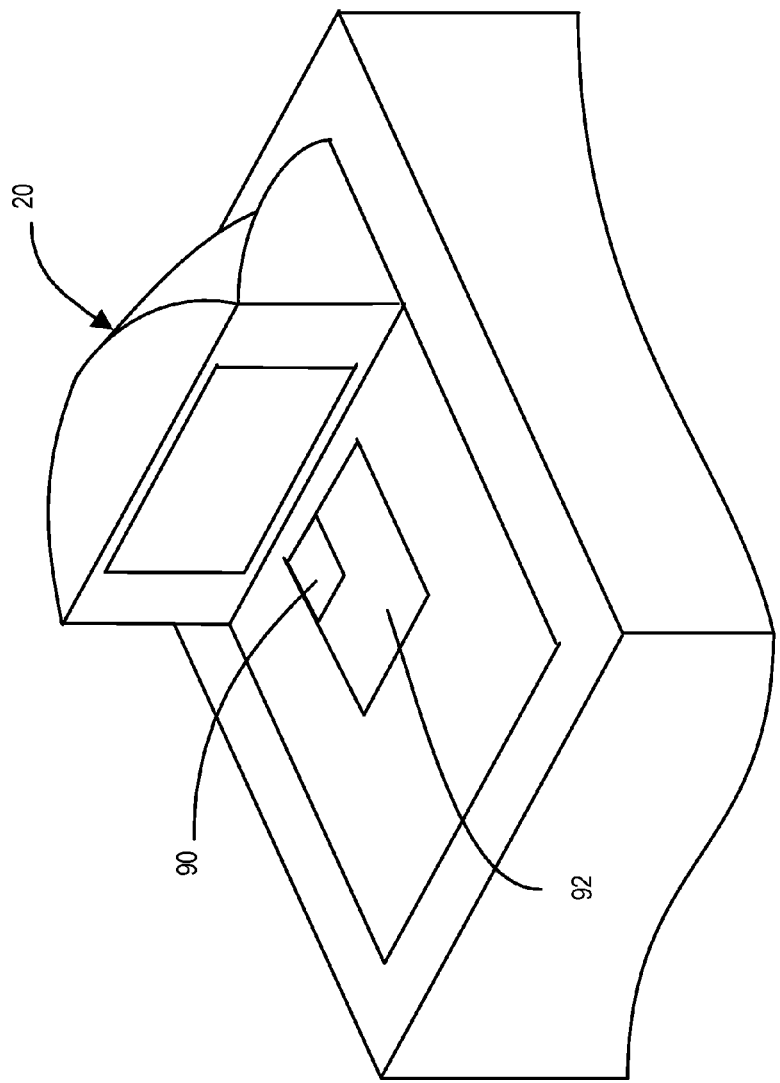
FIG. 3 illustrates an example barcode scanner for use with the method of FIG. 2.

Referring now to FIG. 2-3, an example transaction method is illustrated beginning with step 70, in which transaction software 30 receives product identification information from a barcode scanned by barcode scanner 20.

In step 72, the method inquires whether there are additional products to be scanned. If so, operation returns to step 70 to scan further products. Otherwise, operation proceeds to step 74.

In step 74, transaction software 30 causes a prompt for payment to be displayed. The prompt may be part of a transaction screen displayed by display 16. Alternatively, the prompt may be displayed by a payment peripheral, such as a card reader or combination card reader and PIN pad device.

In response to the prompt, the operator attempts to complete payment with a payment card, such as a credit card using a card reader, which is a default payment peripheral.

In step 76, the method inquires whether payment information was received by transaction software 30. If transaction software 30 receives the payment information from the card reader, operation proceeds to step 84. Otherwise, if transaction software 30 fails to receive the payment information from the card reader and/or the card reader reports an error, then the credit card may be damaged and unreadable. If so, operation proceeds to step 78.

In step 78, transaction software 30 causes a prompt to be displayed requesting that the operator place the credit card 90 on window 92 of scanner 20 with the side having the credit card number face down (FIG. 3). The prompt may be part of a transaction screen displayed by display 16.

The illustrated example barcode scanner 20 in an example checkstand portion includes horizontal and vertical windows. In example scanner configurations, camera 40 may capture images through either or both windows. In an embodiment, credit card 90 may be placed anywhere in window 92. In another embodiment, window 92 has a defined area for capturing payment information from a payment medium, which may be marked or highlighted to assist the customer in placing credit card 90 in the correct location. The prompt in step 78 may also include a graphic illustrating correct placement of the payment medium. Other configurations of barcode scanner 20 are also envisioned.

In step 80, transaction software 30 activates barcode scanner 20 through control circuitry 42. Barcode scanner 20 captures an image of the credit card and processes the image to determine that it is a credit card by its features using feature determining software and to obtain payment information, such as the credit card number, name, and expiration date, using optical character recognition software.

In alternate embodiments, scanner 20 sends image files to transaction software 30. Processor 14 uses local image processing software or image processor software at host 50 to obtain the payment information.

In step 82, transaction software 30 receives the payment information from control circuitry 42.

In step 84, transaction software 30 applies the payment information to the transaction.

In some embodiments, scanner 20 may act as the default payment peripheral for some types of media. In these embodiments, transaction software 30 causes a prompt to be displayed instructing the operator to place these types of media on window 92 of scanner 20 in the first instance.

Although the present invention has been described with particular reference to certain preferred embodiments thereof, variations and modifications of the present invention can be effected within the spirit and scope of the following claims.

What is claimed is:

1. A method of obtaining payment information comprising: activating, by a processor of a self-service transaction system operated by a customer, an imaging barcode scanner to scan a payment medium to obtain payment information from the payment medium based on an error detected, by the processor, in a payment medium reader indicated that the payment medium is unreadable by the payment medium reader.

2. The method of claim 1, further comprising:
receiving, by the processor, product identification information associated with a product from the imaging barcode scanner; and
applying, by the processor, the payment information to complete payment from the product.

3. The method of claim 1, wherein the payment medium comprises a credit card.

4. The method of claim 1, wherein the payment medium comprises a debit card.

5. The method of claim 1, wherein the payment medium comprises a smart card.

6. The method of claim 1, wherein the payment medium comprises a gift card.

7. The method of claim 1, wherein the payment medium comprises an electronic benefit card.

8. The method of claim 1, wherein the payment medium comprises a loyalty card.

9. The method of claim 1, wherein the payment medium comprises a check.

10. The method of claim 1, wherein the payment medium comprises stamps.

11. The method of claim 1, wherein the payment medium comprises a voucher.

12. A method of obtaining payment information comprising:
receiving, by a processor of a self-service transaction system operated by a customer, product identification information associated with a product;
displaying, by the processor, a first prompt to use a payment peripheral to enter payment information;
failing, by the processor, to receive the payment information from the payment peripheral indicated by an error provided by the payment peripheral when the payment peripheral is unable to process a payment medium for the payment information; and
displaying, by the processor, a second prompt to use an imaging barcode scanner to enter the payment information; and activating, by the processor, an imaging barcode scanner to scan the payment medium to obtain the payment information.

13. The method of claim 12, further comprising:
processing, by the processor, an image from the imaging barcode scanner to obtain the payment information.

14. The method of claim 12, further comprising:
sending, by the processor, an image from the imaging barcode scanner to a host to obtain the payment information.

15. The method of claim 12, wherein the second prompt includes instructions for correctly placing the payment medium on the imaging barcode scanner.

16. A transaction computer system comprising:
an imaging barcode scanner; and
a processor configured to activate the imaging barcode scanner to scan a payment medium to obtain payment information from the payment medium based on an error provided by a payment peripheral when the payment peripheral is unable to process the payment medium, and wherein the transaction computer system is a self-service transaction system operated by a customer.

17. The system of claim 16, wherein the processor is also configured to receive product identification information associated with a product from the imaging barcode scanner, and to apply the payment information to complete payment for the product.

18. The system of claim 16, wherein the payment medium comprises a payment card.

* * * * *